3,639,364
PREPARATION OF N-ALLYL IMINODIACETIMIDE DIOXIME AND POLYMERS THEREOF
Donald Edward Jefferson, Sykesville, Md., assignor to W. R. Grace & Co., Clarksville, Md.
No Drawing. Filed Nov. 3, 1969, Ser. No. 873,597
Int. Cl. C08f 7/12, 15/14
U.S. Cl. 260—80.3      12 Claims

ABSTRACT OF THE DISCLOSURE

N-allyl iminodiacetamide dioxime and N,N-diallyl aminoacetamidoxime are synthesized by the reaction of N-allyl iminodiacetonitrile and N,N-diallyl aminoacetonitrile with hydroxylamine. These oximes and dioximes are then further polymerized to yield hard resins.

BACKGROUND OF THE INVENTION

This invention relates to the copolymerization of N-allyl iminodiacetamidedioxime and N,N-diallyl aminoacetamidoxime with acrylic acid. This invention further relates to the homopolymerization of N,N-diallyl aminoacetamidoxime.

These oximes are useful as monomers, as well as being useful reaction intermediates. The allyl groups of N,N-diallyl aminoacetamidoxime undergo an addition polymerization, forming a resin having pendant oxime and imine groups. These resins are useful as chelating agents and water treating compounds. N-allyl iminodiacetamidedioxime and N,N-diallyl aminoacetamidoxime undergo a copolymerization with acrylic acid to yield a resin having pendant oxime, imine and carboxyl groups. These resins are useful chelating agents, as well as being useful in water treatment.

The prior art in regard to the N-allyliminodiacetamidedioxime and N,N-diallyl aminoacetamidoxime appears to be well illustrated in U.S. Pats. 2,947,792 and 2,902,782 respectively. U.S. Pat. 2,947,782 discloses the synthesis of substituted aminoacetamidoximes by the reaction of substituted aminoacetonitriles with hydroxylamine salts. U.S. Pat. 2,902,514 discloses the synthesis of bis-iminodiacetamidedioxime by the reaction of bis-iminodiacetonitrile with salts. However, in neither reference is there an unsaturated group present in the compound. Further, neither reference discloses an oxime or dioxime having an unsaturation capable of undergoing a polymerization reaction. Prior to the present invention, N-allyl iminodiacetamidedioxime and N,N-diallyl aminoacetamidoxime have not been produced by reaction with hydroxylamine due to the expected hydroxyamination of the olefinic unsaturation. In regard to polymers of N-allyl iminodiacetamidedioxime and N,N-diallyl aminoacetamidoxime, the prior art is devoid of any reference to these oximes as monomers or to any polymers or copolymers of these oximes.

It is also an object of this invention to disclose polymers of N,N-diallyliminodiacetamidedioxime and the method of producing these polymers.

It is further an object of this invention to disclose copolymers of N-allyl iminodiacetamidedioxime and N,N-diallyl aminoacetamidoxime with acrylic acid and the method of producing these copolymers.

SUMMARY OF INVENTION

This invention comprises the homopolymerization of N,N-diallyl aminoacetamidoxime, and the copolymerization of both N,N-diallyl aminoacetamidoxime and N-allyl iminodiacetamidedioxime with acrylic acid. The homopolymer of N,N-diallyl aminoacetamidoxime formed has pendant oxime and amine groups. The copolymer of N,N-diallyl aminoacetamidoxime with acrylic acid has pendant oxime, amine and carboxy groups. The copolymer of N-allyl iminodiacetamidedioxime and acrylic acid has pendant oxime, imine hydrogen and carboxy groups.

DETAILED DESCRIPTION OF THE INVENTION

The synthesis of the oxime monomers of the present invention comprises the reaction of the corresponding nitrile with hydroxylamine or hydroxylamine salt to yield the oxime. The synthesis of N-allyl iminodiacetamidedioxime is essentially as follows:

(1)

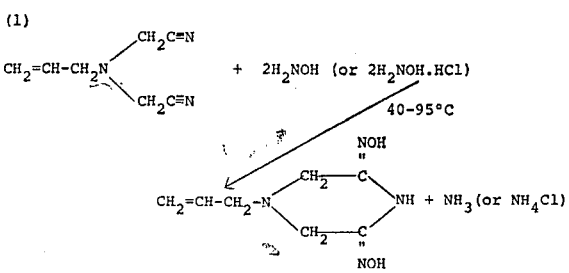

The synthesis of N,N-diallyl aminoacetamidoxime is essentially as follows:

(2)

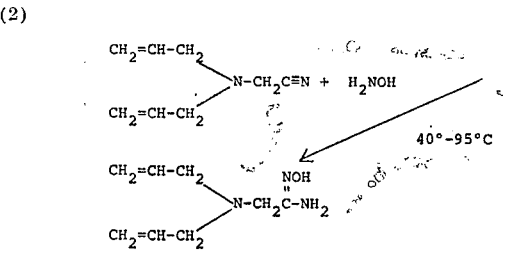

Reaction stoichiometry is as set out in Equations 1 and 2. However, it is preferred to use an excess of hydroxylamine or hydroxylamine salt. This excess over stoichiometry ranges from about 50 percent to about 200 percent. The use of such an excess increases the rate of reaction and enables it to go to higher degree of completion. The hydroxylamine is preferably added as the hydrochloride salt. When added as the hydrochloride salt, reaction (1) yields N-allyl iminodiacetamidedioxime and ammonium chloride and reaction (2) yields N,N-diallyl aminoacetamidoxime with minor formation of the hydrochloride salt.

The temperature of reaction is preferably between 40° C. to 95° C. More particularly, the temperature of reaction is governed by the reaction solvent. When methanol is the solvent, a temperature of about 68° C. is the maximum used. But if water or a higher boiling organic solvent is used, the reaction temperature may range up to the reflux point of the solvent. The preferred solvents are methanol, ethanol, propanol and water. The solvent must be capable of solubilizing both the hydroxylamine or hydroxylamine-yielding compound and the N,N-diallyl aminoacetonitrile or N-allyl iminodiacetonitrile reactant.

The homopolymerization and copolymerization of N,N-diallyl aminoacetamidoxime and N-allyliminodiacetamidedioxime comprises an olefinic addition polymerization to produce a saturated polymer having pendant oxime, amine, imine hydrogen and carboxy groups. The homopolymerization of N,N-diallyl aminoacetamidoxime produces a polymer having as a repeating unit

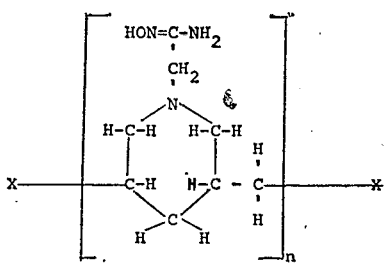

wherein X is H, a free radical catalyst fragment or a terminal unsaturation and $n$ ranges from about 10 to 1000. The copolymer of N,N-diallylaminoacetamidoxime with acrylic acid produces a polymer having as a repeating unit

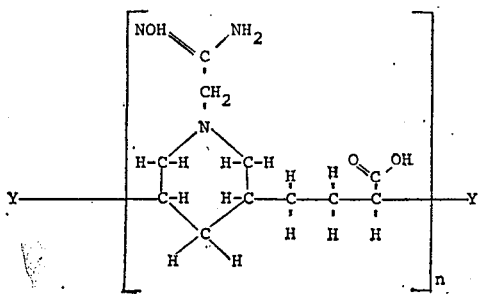

wherein Y is H, a free radical catalyst fragment or a terminal unsaturation, and $n$ ranges from about 10 to 1000. The copolymer of N-allyliminodiacetamidedioxime with acrylic acid produces a polymer having as a repeating unit

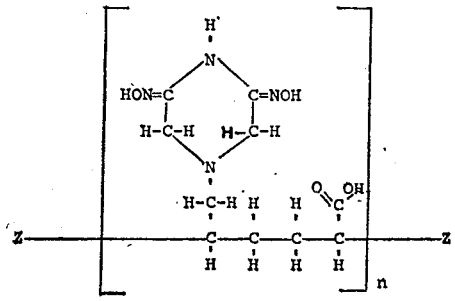

wherein Z is H, a free radical catalyst fragment or a terminal unsaturation, and $n$ ranges from about 10 to 1000. These homopolymers and copolymers range from soft to hard materials depending on the molecular weight of the polymer formed.

The polymerization reaction is conducted in a solvent either by redox or free radical catalysis depending on the polymerization mechanism. The homopolymerization of N,N-diallyl aminoacetamidoxime is carried out by the redox or free radical catalyzed polymerization of N,N-diallyl aminoacetamidoxime hydrochloride. The copolymerization of either N,N-allyl aminodiacetamidoxime hydrochloride or N-allyl iminodiacetamidedioxime hydrochloride with acrylic acid is also performed by redox or free radical catalysis. It is necessary in the homopolymerization of N,N-diallyl aminoacetamidoxime, or the copolymerization of N,N-diallyl aminoacetamidoxime or N-allyl iminodiacetamidedioxime that these compounds be in the hydrochloride salt form. Polymerization does not noticeably occur when the non-salt form is used. It is theorized that the hydrochloric acid inhibits the basicity of the tertiary nitrogen in these compounds. Suitable redox catalysts comprise potassium persulfate and ceric ion derived from a ceric salt such as ceric sulfate. Useful free radical catalysts include the peroxides such as t-butyl-hydroperoxide, stearyl peroxide, lauryl peroxide and other acyl peroxides and azobis isobutyronitrile.

The polymerization temperature is not critical, and will be governed by the choice of solvents. Suitable solvents are water and the aliphatic alcohols. The useful alcohols include methanol, ethanol, propanols and butanols. The maximum temperature for effective polymerization will be the solvent reflux temperature. The temperature is preferably maintained at about 50° C.

The amount of catalyst added is dependent on the desired molecular weight of the end polymer. As the amount of catalyst added increases, more sites will be activated at any one time, yielding a polymer of low molecular weight. It is preferred to add the catalyst so that it will be present from about 0.2 milliequivalent (meq.) to about 10 meq. for each equivalent of monomer.

The amounts of monomers added are substantially equimolar in order to produce N,N-diallyl aminoacetamidoxime hydrochloride and N-allyl iminodioacetamidedioxime hydrochloride acrylic acid stoichiometric copolymers. This will produce a generally alternating structure. However, other concentrations to produce copolymers having higher amounts of either the oxime monomer or the acrylic monomer can be produced by the present process. These may be suitably in the range of from about 10 mole percent of acrylic acid monomer up to about 90 mole percent. The use of such concentrations produces a non-stoichiometric non-alternating structure wherein there will be linkages between like monomers.

After formation of the polymer, if solvent removal is necessary, it can be removed by any art recognized technique. Suitable techniques are evaporation, vacuum distillation or selective precipitation. A preferred technique is vacuum distillation. However, for most uses, and especially for use as a chelating agent or a water-treating compound, solvent removal is not necessary.

The following examples are set out to further amplify the invention.

EXAMPLE 1

.2 mole (27.2 gms.) of N,N-diallyl cyanomethyl amine is added to 100 ml. of methanol. This mixture is stirred until the N,N-diallyl cyanomethyl amine goes into solution. 150 ml. of an aqueous solution of .6 mole (44 gms.) of hydroxyl amine hydrochloride which has been treated with .3 mole (31.8 g.) of sodium carbonate, is added to this solution. The solution is heated at 70° C. for two hours. The solution is cooled and condensed in a Rotovap to one-half the original volume. A white crystalline product is filtered and washed twice with 50 ml. portions of ice water. The yield is 53.1 percent, with a melting point of 107–108° C. NMR and infrared spectroscopy confirms the product as N,N-diallyl aminoacetamidoxime.

EXAMPLE 2

.2 mole (27 g.) of N-allyl iminodiacetonitrile is added to 150 ml. of methanol which produces a clear solution. 150 ml. of a .6 mole (44 g.) aqueous solution of hydroxylamine hydrochloride which has been treated with .3 mole (31.8 g.) of sodium bicarbonate is added to this solution. This solution is heated to 70° C. for 3 hours. The solution is concentrated to one-half volume in a Rotovap and cooled. A white crystalline material precipitates, which is recrystallized from hot water. The material is produced in a 50.8 percent yield, has a melting point of 183.4–184.6° C., and is confirmed by elemental analysis to be N-allyl iminodiacetamidedioxime.

EXAMPLE 3

.2 mole (34 g.) of N,N-diallyl aminoacetamidoxime is solubilized in 150 ml. of water. .2 mole (7.2 g.) of hydrochloric acid as a 30 percent solution is added to this solution. 300 ml. of acetone is then added, and the white crystalline salt of N,N-diallyl aminoacetamidoxime hydrochloride precipitates. 20 g. of the solid is dissolved in 100 ml. of water and 0.5 g. of potassium persulfate is added, and this mixture is heated to 80° C. for six hours. This mixture is cooled and water solvent removed, using a Rotovap. A yellow-white, water soluble, solid remains, which softens above 225° C.

EXAMPLE 4

.2 mole (34 g.) of N,N-diallyl aminoacetamidoxime is solubilized in 150 ml. of water. .2 mole (7.2 g.) of hydrochloric acid as a 30 percent solution is added to this solution. 300 ml. of acetone is added to this solution and the white crystalline salt of N,N-diallyl aminoacetamidoxime hydrochloride precipitates. 1.5 g. of ceric sulfate and 10 ml. of isopropanol are added, and this mixture is heated to 80° C. for six hours. This mixture is cooled, and water solvent removed using a Rotovap. A yellow-white, water soluble, solid remains which softens above 225° C.

EXAMPLE 5

A reaction vessel equipped with a heating mantle, stirrer, condenser, thermometer and an inlet for reactant addition is assembled. 0.04 mole of N,N-diallyl aminoacetamidoxime hydrochloride (salt is formed, as in Example 3) in 100 ml. of water is added to the vessel. 0.09 g. of t-butylhydroperoxide is then added to this mixture. The vessel is heated to 70° C. to 80° C. with stirring, and a solution of 0.04 mole acrylic acid in 50 ml. of water is added dropwise at a rate of about 2 drops per minute. Heating is continued for two hours, and a water soluble copolymer of about 56 percent yield is formed. Water solvent is removed by vacuum distillation, yielding a copolymer which softens above 220° C.

EXAMPLE 6

A reaction vessel equipped with a heating mantle, stirrer, condenser, thermometer and an inlet for reactant addition is assembled. 0.04 mole of N,N-diallyl aminoacetamidoxime hydrochloride (salt is formed as in Example 3) in 100 ml. of water is added to the vessel. 0.10 g. of lauryl peroxide is then added to this mixture. The vessel is heated to 70° C. to 80° C. with stirring, and a solution of 0.04 mole acrylic acid in 50 ml. of water is added dropwise at a rate of about two drops per minute. Heating is continued for one hour, and a water soluble copolymer of about 64 percent yield is formed. This copolymer softens above 220° C.

EXAMPLE 7

A reaction vessel equipped with a heating mantle, stirrer, condenser, thermometer and an inlet for reactant addition is assembled. 0.04 mole of N-allyl iminodiacetamide dioxime in 100 ml. of water is added to the vessel. 0.04 more of hydrochloric acid as a 30 percent aqueous solution is added with stirring, to yield an aqueous solution of N-allyl iminodiacetamidedioxime hydrochloride. 0.09 g. of t-butylhydroperoxide is then added to this mixture. The vessel is heated to 50° C. to 60° C. with stirring, and a solution of 0.04 mole acrylic acid in 50 ml. of water is added dropwise at a rate of about two drops per minute. Heating is continued for three hours, and a water soluble copolymer in about 60 percent yield is formed. Water solvent is removed by vacuum distillation, yielding a copolymer which softens above 160° C.

EXAMPLE 8

A reaction vessel equipped with a heating mantle, stirrer, condenser, thermometer and an inlet for reactant addition is assembled. 0.04 mole of N-allyl iminodiacetamidedioxime in 100 ml. of water is added to the vessel. 0.04 mole of hydrochloric acid as a 30 percent aqueous solution is added with stirring to yield an aqueous solution of N-allyl iminodiacetamidedioxime hydrochloride. 0.03 g. of t-butylhydroperoxide is then added to this mixture. The vessel is heated to 70° C. to 80° C. with stirring, and a solution of 0.06 mole acrylic acid in 50 ml. of water is added dropwise at a rate of about two drops per minute. Heating is continued for 3 hours, and a water soluble copolymer in about 70 percent yield is formed. This copolymer softens above 180° C.

What is claimed is:

1. The polymer poly(N,N-diallyl aminoacetamidoxime) essentially having a structure

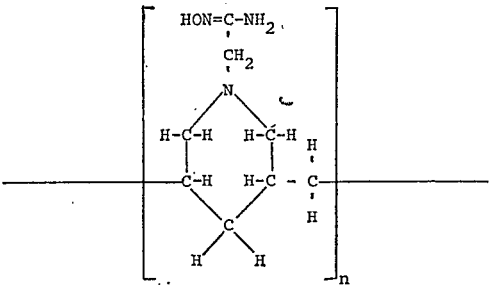

wherein $n$ is an integer of from about 10 to 1000.

2. The copolymer of N,N-diallyl aminoacetamidoxime-acrylic acid essentially having the structure

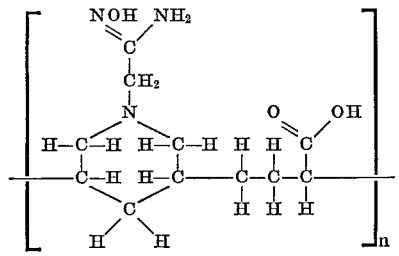

wherein $n$ is an integer of from about 10 to 1000.

3. The copolymer of N-allyl imino-diacetamide dioxime-acrylic acid having essentially the structure

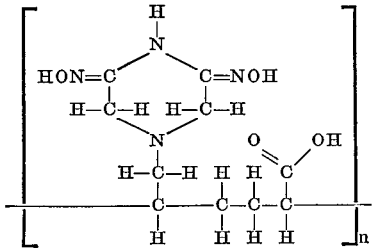

wherein $n$ is an integer of from about 10 to 1000.

4. The process for producing the polymer of claim 1, comprising:
    forming a mixture of N,N-diallyl aminoacetamidoxime hydrochloride and a solvent;
    adding a free radical catalyst and heating this mixture to form said polymer.

5. The process of claim 4, wherein said free radical catalyst is a redox catalyst.

6. The process of claim 4, wherein said catalyst is selected from the group consisting of potasium persulfate, ceric sulfate, t-butyl-hydroperoxide, stearyl peroxide, lauryl peroxide and azobis isobutyro-nitrile.

7. The process for producing the copolymer of claim 2, comprising:
    forming a mixture of N,N-diallyl aminoacetamidoxime hydrochloride and a solvent;
    adding a free radical catalyst to said mixture; and
    adding acrylic acid to form said copolymer.

8. The process of claim 7, wherein said free radical catalyst is a redox catalyst.

9. The process of claim 7, wherein said catalyst is selected from the group consisting of postassium persulfate, ceric sulfate, t-butyl-hydroperoxide, stearyl peroxide, lauryl peroxide and azobis isobutyro-nitrile.

10. The process for producing the copolymer of claim 3, comprising:
   forming a mixture of N-allyl iminodiacetamidedioxime hydrochloride and a solvent;
   adding a free radical catalyst to said mixture; and
   adding acrylic acid to form said copolymer.

11. The process of claim 10, wherein said free radical catalyst is a redox catalyst.

12. The process of claim 10, wherein said catalyst is selected from the group consisting of potassium persulfate, ceric sulfate, t-butyl-hydroperoxide, stearyl peroxide, lauryl peroxide and azobis isobutyronitrile.

References Cited

UNITED STATES PATENTS

| 2,671,076 | 3/1954 | Price | 260—89.7 N |
| 2,926,161 | 2/1960 | Butler et al. | 260—89.7 N |
| 3,515,707 | 6/1970 | Reimschuessel et al. | 260—88.3 R |

HARRY WONG, JR., Primary Examiner

U.S. Cl. X.R.

210—1; 260—29.6, 88.3, 89.7, 264 G, 268 SY